No. 788,159. PATENTED APR. 25, 1905.
A. & T. LEADBEATER.
MANUFACTURE OF SOLES FOR BOOTS OR SHOES.
APPLICATION FILED MAY 9, 1904.
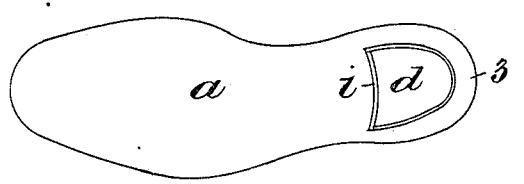
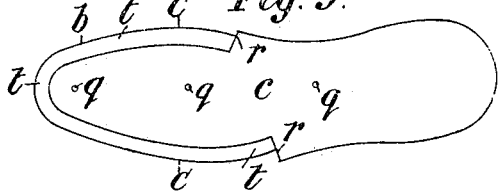
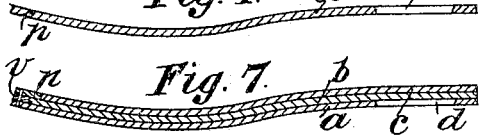
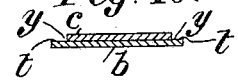
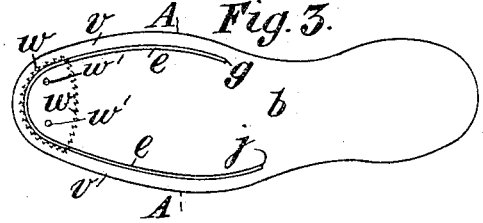
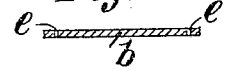
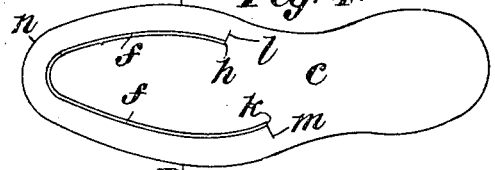
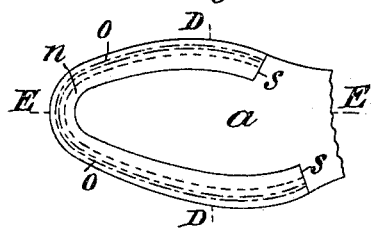
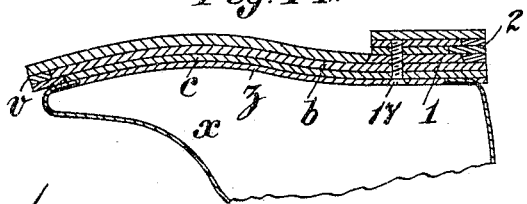
Witnesses:—
William Sadler
Annie Park.
Inventors.
Alfred Leadbeater
Tom Leadbeater
by Fairburn Hart
Attorney.

No. 788,159.  Patented April 25, 1905.

UNITED STATES PATENT OFFICE.

ALFRED LEADBEATER AND TOM LEADBEATER, OF LEEDS, ENGLAND, ASSIGNORS TO THE ELBEEGEE SYNDICATE, LIMITED, OF LONDON, ENGLAND, A CORPORATION OF ENGLAND.

MANUFACTURE OF SOLES FOR BOOTS OR SHOES.

SPECIFICATION forming part of Letters Patent No. 788,159, dated April 25, 1905.

Application filed May 9, 1904. Serial No. 207,101.

*To all whom it may concern:*

Be it known that we, ALFRED LEADBEATER, residing at 3 Hessle Terrace, Brudenell Road, and TOM LEADBEATER, residing at Fairleigh, Shaftesbury avenue, Roundhay, Leeds, in the county of York and Kingdom of England, subjects of the King of Great Britain and Ireland, have invented new and useful Improvements in or Relating to the Manufacture of Soles for Boots or Shoes, of which the following is a specification.

This invention relates to a method of making soles for boots and shoes—such, for instance, as those described in the specification of Letters Patent granted to the said Tom Leadbeater on the 20th day of August, 1901, No. 680,868. The detachable sole therein described and illustrated consists of an outer layer (termed the "outer sole,") of leather onto which is built a projecting rim and inturned overhanging flange to form an internal recess. A projecting ledge on the middle sole (which is built up in one or more layers) is adapted to slide or be drawn into the said internal recess. The middle sole before it is securely fastened to the upper is first shaped to the exact contour of the outer sole.

Now the object of the present invention is to provide a method whereby the above-mentioned projecting rim and inturned overhanging flange of the outer sole and the projecting ledge of the middle sole are formed out of their respective layers in such a manner that there will be a minimum loss of material, with a certainty of the parts when placed together accurately fitting or meshing with each other.

In the drawings hereunto annexed, Figure 1 is a longitudinal section, and Fig. 2 a plan, of the outer sole. Figs. 3 and 4 are respectively plans of the two portions of the middle sole. Figs. 5 and 6 are respectively transverse sections on line A A, Fig. 3, and B B, Fig. 4. Fig. 7 is a sectional elevation of the sole with its layers placed one upon the other ready for being sewed together. Fig. 8 is a plan of same. Fig. 9 is a plan of the two portions of the middle sole detached from the outer sole after the sewing operation has taken place. Fig. 10 is a transverse section on line C C, Fig. 9. Fig. 11 is a part plan of the outer sole with inturned flange attached thereto. Figs. 12 and 13 are respectively a transverse section on line D D and a longitudinal section on line E E, Fig. 11; and Fig. 14 is a sectional elevation of a portion of a boot with a removable heel and with the herein-described improved detachable sole applied.

In the drawings hereunto annexed the middle and outer soles are shown (for example only) formed of three layers—namely, the outer sole of layer $a$ and the middle sole of two layers $b$ $c$. The whole of the three parts are at first cut externally in the usual manner of the same size and to the required shape of the outer sole $a$. The outer sole $a$ is provided with an opening $d$, Figs. 1 and 2, to form a loop 3 of a suitable depth from the perimeter of the heel, whereby that portion of the detachable sole may be passed over and around the heel, as well as to permit of a portion thereof passing under the breast of the heel. The opening $d$ is shaped to correspond with the contour of the heel-block.

Portions of the middle sole marked $b$, Fig. 3, and $c$, Fig. 4, are respectively provided with a marginal cut or slit $e$, Fig. 3, and $f$, Fig. 4, at a suitable distance from the perimeter of the fore part of the sole—that is, the slits start at $g$, Fig. 3, and $h$, Fig. 4, at the waist of the sole and at a suitable distance from the breast portion $i$, Fig. 2, of the opening of the heel, (when the three layers are together, as at Fig. 7,) and the slits are made to pass round the fore part of each portion of the sole parallel, or nearly so, with the perimeter until a point is reached at the waist on the opposite side of each sole at $j$, Fig. 3, and $k$, Fig. 4. The slit in layer $b$ is nearer to the perimeter than the slit in layer $c$. At the points where the slit $f$ commences and ends additional slits $l$ $m$, Fig. 4, are provided at an angle thereto in layer $c$ and made to extend for a portion of the distance from the first-named slit to the perimeter of the sole. The two last-named slits act as guides for subsequently severing a recessed rim portion *n* from the middle sole.

The three layers *a b c* are placed together in consecutive order one upon the other, as in Fig. 7, and are then secured in position by brads, rivets, clamps, or other means *q*, Fig. 8, while the three layers are afterward sewed with one or more lines of stitching *o*, Fig. 8, extending from line *l* to line *m* at a suitable distance from the perimeter and between it and the slit *e*. A channel *p*, Fig. 1, is provided, if so desired, on the outer surface of layer *a* to receive the stitching and afterward closed in the usual manner. After layers *a*, *b*, and *c* have been stitched together layer *c* is first divided from layer *b* by prolonging the slits *l* and *m* to the periphery, whereby two shoulders *r r*, Fig. 9, are formed in this layer, and by making slits from *g* and *j* to the perimeter in layer *b* two shoulders *s s*, Fig. 11, are thereby formed in that layer also. The last-named cutting permits the layers *b* and *c* to be completely drawn away (after removing temporary fastenings *q*) from between and out of the recessed rim which has thereby been formed on the outer sole. At the same time by allowing the portion of the layer *b* within the boundary of the slit *e* to project beyond the boundary of the portion of the layer *c* within the slit *f*, as shown at *t*, Figs. 9 and 10, a projection is formed, which will pass within recesses *u u*, Fig. 12, of the projecting flange or rim *n*. It will readily be understood that the flange *n* and the wall of the recess *u*, Fig. 12, are formed, respectively, out of the portions of the layers *b c*, forming the middle sole, that lie between the slits *e f* and the periphery of the sole and which have been sewed to the layer *a*. By sewing these portions to the layer *a* and afterward cutting and separating the rim portions of the two layers as described the said portions sewed to the layer *a* form a recess with an overhanging flange that will accurately envelop the projecting portion of the layer *b* and will fit into the recess formed on the top thereof, as shown at *y*, Fig. 10.

The rear portions of layers *b* and *c* are attached together and to the upper by any convenient means. The two layers *b c* when fastened to the upper of the boot in any convenient or usual manner in the relative position described will have layer *c*, which is narrowest, across the fore part, next to the upper of the boot and its insole. Layer *b* then follows, and the effect of the slit at *e g j*, previously made, will be to form a recess *y*, Fig. 10, round the edge or perimeter of the fore part of it between the shoulders *r r*, while the corresponding slit on the layer *c* will form a rabbet or recess round its edge between the shoulders *s s*, leaving a ledge to project between the same limits.

The parts *n v* of the layers *b c* of leather left stitched or secured on the outer sole *a* when the two main portions of the said layers are cut and drawn away will be in the form of an upwardly-projecting rim, Figs. 12 and 13, thereby providing an internal recess *u* and an inturned or overhanging flange. As these parts previously formed the edges of the middle sole, so will the middle and outer soles now exactly fit onto each other when they are drawn together without any further fitting.

To reduce the strain on the toe portions of the detachable sole when in use and also to support the stitching around the same, a piece of thin metal *w*, (shown in dotted lines at Fig. 3,) shaped to the contour of the toe, is preferably fixed to layer *b* by nails or rivets *w'*. The metal plate *w*, which is curved at its front to suit boots with narrow toes and at its rear portion to suit boots with broad toes, is provided with serrated edges on such portions which are allowed to overhang or project beyond the perimeter of the toe portion of said layer. When the three portions of the sole are placed together, the serrations are made to enter the wall *v* of the recess and flanged rim *n*, fixed to the outer sole *a*, thereby preventing any movement of the portions of the sole taking place at the toe and removing any undue strain on the inturned flange of the rim and on the layer *b*, to which it is fixed.

In Fig. 14, *x* is the upper of a boot (or shoe) lasted to an inner sole *z* in the usual manner. The layers *b* and *c*, as shown at Fig. 9, are then attached to the lasted upper by stitching or screws in the usual manner, the layer *b* being provided with a flanged and recessed heel-block 1. The heel-block receives a removable heel 2, having a recess and inturned flange adapted to fit into the flange and recess of the said heel-block. The loop 3 of the portion *a* of the detachable sole having been pressed over the heel-block prevents the detachable sole working out of the position, and the loop itself is kept around the heel-block by the removable heel. A screw 17 is made to pass from the inside of the boot (or shoe) for securing the heel in position on the heel-block.

Having described our invention, what we claim, and desire to secure by Letters Patent, is—

1. In the manufacture of boots and shoes, the method of forming a sole having a detachable outer portion which consists in cutting marginal slits in the fore parts of two layers forming the middle sole, superposing said layers upon the outer sole, connecting the severed marginal portions of said layers to the outer sole to form a flange thereon, and then separating the two layers forming the middle sole from the said marginal portions, whereby a flange is formed on the removable outer sole conforming to the fore part of the middle sole.

2. In the manufacture of boots and shoes, the method of forming a sole having a detachable outer portion, which consists in making marginal slits in the fore part of two layers forming the middle sole, the slit in the upper layer being farther from the periphery of the sole than the slit in the lower layer, superposing said layers upon the outer sole, connecting the severed marginal portions of the middle sole with the outer sole to form a retaining-flange thereon, and finally separating the body portions of the middle sole from the said marginal portions thereof, whereby the outer sole is formed with an undercut flange conforming to the contour of the middle sole.

3. In the manufacture of boots and shoes, the method of forming a sole having a detachable outer portion, which consists in cutting several layers of material to the same external shape, forming marginal slits in the fore parts of two layers constituting a middle sole, said slits being at different distances from the periphery, superposing the slitted layers upon an outer sole, then temporarily connecting the said layers, then stitching the severed marginal portions of the middle sole to the outer sole, and then separating the body portions of the middle sole from the severed marginal portions thereof.

4. In the manufacture of boots and shoes, the method of forming a sole having a detachable outer portion, which consists in cutting marginal slits in the fore parts of two suitably-shaped layers of sole material, said slits being respectively at different distances from the peripheries of said layers, superposing said layers upon a third layer of said material, stitching the severed marginal portions of the first-mentioned layers to the last-mentioned layer to form a flange thereon, and finally cutting the body portions of the two first-named layers from the severed marginal portions, whereby the single layer is provided with an undercut flange conforming to the fore parts of the other layers.

In testimony whereof we have signed our names to this specification in the presence of the two subscribing witnesses.

ALFRED LEADBEATER.
TOM LEADBEATER.

Witnesses:
WILLIAM SADLER,
ANNIE PARK.